(12) United States Patent
Kraemer

(10) Patent No.: US 9,827,953 B2
(45) Date of Patent: Nov. 28, 2017

(54) UTILITY VEHICLE WITH JACKING SYSTEM AND STABILIZATION MEANS

(71) Applicant: Iveco Magirus AG, Ulm (DE)

(72) Inventor: Jens Kraemer, Ulm (DE)

(73) Assignee: Iveco Magirus AG, Ulm (DE)

( * ) Notice: Subject to any disclaimer, the term of this patent is extended or adjusted under 35 U.S.C. 154(b) by 30 days.

(21) Appl. No.: 14/603,151

(22) Filed: Jan. 22, 2015

(65) Prior Publication Data

US 2015/0203078 A1   Jul. 23, 2015

(30) Foreign Application Priority Data

Jan. 23, 2014   (EP) .................................... 14152250

(51) Int. Cl.
| | |
|---|---|
| *B60S 9/10* | (2006.01) |
| *B60G 17/005* | (2006.01) |
| *B60G 17/017* | (2006.01) |
| *B60G 17/08* | (2006.01) |
| *B60G 9/02* | (2006.01) |

(Continued)

(52) U.S. Cl.
CPC .............. *B60S 9/10* (2013.01); *B60G 17/005* (2013.01); *B60G 17/017* (2013.01); *B60G 17/08* (2013.01); *B66C 23/80* (2013.01); *B66C 23/90* (2013.01); *B66F 11/046* (2013.01); *B66F 17/006* (2013.01); *E06C 5/36* (2013.01); *E06C 5/38* (2013.01); *A62C 27/00* (2013.01); *B60G 9/02* (2013.01); *B60G 2202/24* (2013.01); *B60G 2202/413* (2013.01); *B60G 2204/4605* (2013.01); *B60G 2204/81* (2013.01); *B60G 2204/8304* (2013.01); *B60G 2300/02* (2013.01);

(Continued)

(58) Field of Classification Search
CPC ...... B60S 9/10; B60S 9/20; B60S 9/18; B66C 23/80; B66C 23/90; B66C 23/78
USPC ................................................... 254/418–425
See application file for complete search history.

(56) References Cited

U.S. PATENT DOCUMENTS

| | | | |
|---|---|---|---|
| 3,950,007 A | 4/1976 | Berger | |
| 4,276,985 A * | 7/1981 | Newman ................. | B66C 23/62 |
| | | | 212/177 |

(Continued)

FOREIGN PATENT DOCUMENTS

| | | |
|---|---|---|
| DE | 39 34 499 A1 | 4/1991 |
| FR | 2 261 900 A1 | 9/1975 |

(Continued)

*Primary Examiner* — Monica Carter
*Assistant Examiner* — Seahee Yoon
(74) *Attorney, Agent, or Firm* — Blank Rome LLP

(57) ABSTRACT

A utility vehicle, in particular a firefighting vehicle, comprising an extendable aerial apparatus like a turnable ladder and/or an aerial rescue platform, a jacking system with lateral ground supports for jacking the vehicle body, and a stabilization mechanism for preventing tilting of the vehicle body in its jacked state. The stabilization mechanism includes a hydraulically operable rear axle blocking device for blocking the rear axle suspension of the vehicle. The stabilization mechanism further includes at least one hydraulically lockable shock absorber integrated into the front axle suspension of the vehicle. The rear axle blocking device and the hydraulically lockable shock absorber are controlled by a common hydraulic control to lock the hydraulically lockable shock absorber at the same time or with a delay after activating the rear axle blocking device.

5 Claims, 1 Drawing Sheet

(51) Int. Cl.
*B66C 23/80* (2006.01)
*B66C 23/90* (2006.01)
*B66F 11/04* (2006.01)
*B66F 17/00* (2006.01)
*E06C 5/36* (2006.01)
*E06C 5/38* (2006.01)
*A62C 27/00* (2006.01)

(52) U.S. Cl.
CPC ...... *B60G 2300/06* (2013.01); *B60G 2600/02* (2013.01)

(56) References Cited

U.S. PATENT DOCUMENTS

| | | | | |
|---|---|---|---|---|
| 4,393,959 | A * | 7/1983 | Acker | B60G 9/02 187/222 |
| 4,705,295 | A * | 11/1987 | Fought | B60G 17/005 212/301 |
| 5,117,950 | A * | 6/1992 | Kobayashi | B60G 17/005 188/300 |
| 5,180,028 | A * | 1/1993 | Perrenoud, Jr. | B60G 9/02 180/235 |
| 5,778,569 | A * | 7/1998 | Schaeff | B60G 17/005 180/418 |
| 8,727,379 | B2 * | 5/2014 | Goeggelmann | B60S 9/04 280/763.1 |
| 2001/0024021 | A1 * | 9/2001 | Allen | B60G 17/005 280/6.157 |
| 2009/0020965 | A1 * | 1/2009 | North | B60G 9/02 280/5.508 |
| 2013/0277954 | A1 * | 10/2013 | Goeggelmann | B66C 23/80 280/763.1 |
| 2014/0332488 | A1 * | 11/2014 | Appling | E06C 5/24 212/302 |

FOREIGN PATENT DOCUMENTS

| | | |
|---|---|---|
| GB | 2 187 432 A | 9/1987 |
| GB | 2 271 100 A | 4/1994 |

* cited by examiner

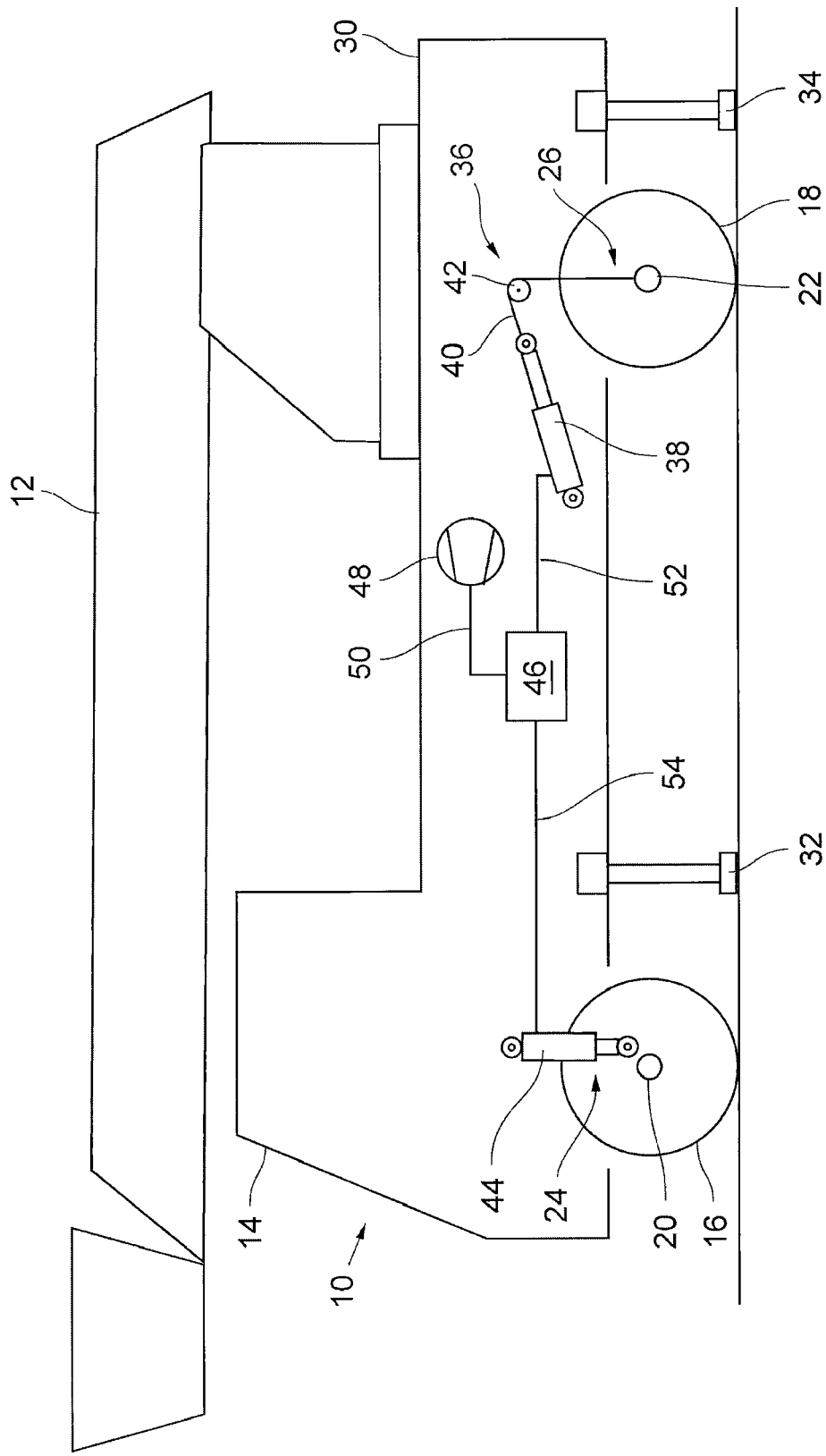

UTILITY VEHICLE WITH JACKING SYSTEM AND STABILIZATION MEANS

BACKGROUND OF THE INVENTION

1. Field of the Invention

The present invention relates to a utility vehicle, in particular a fire fighting vehicle, comprising an extendable areal apparatus like a turnable ladder and/or an areal rescue platform and a jacking system.

2. Description of the Related Art

When the areal apparatus of a utility vehicle, such as a fire fighting vehicle, is extended, it is important to secure the vehicle against a tilting movement in the lateral direction. For this purpose, jacking systems are provided that comprise lateral ground supports for jacking a vehicle body. These supports can be extracted from the vehicle body into an operating position in which the ends of the supports rest on the ground, so that the weight load of the vehicle rests on the supports, and the vehicle axles and their suspensions are relieved. In some cases the vehicle is lifted from the ground completely, so that the wheels do not have contact with the ground anymore. However, in other cases it is completely sufficient to lift the vehicle body from the axle in a way that the wheels keep a minimum of ground contact.

To perform this deflection of the vehicle load to the lateral ground supports, the jacking system comprises stabilization means with a rear axle blocking device for blocking the rear axle suspension of the vehicle. This rear axle blocking device can be operated hydraulically and may comprise, for example, a pulling means for pulling the rear axle in an upward direction against the vehicle body, i.e. against the spring force of the rear axle suspension. In its activated state, with the rear axle pulled against the vehicle body, the rear axle suspension is blocked completely to prevent any relative movement of the axle against the vehicle body. In a simple and common construction, the pulling operation of the rear axle blocking device is performed by a steel rope connecting the rear axle with the end of a hydraulic cylinder and being guided over a deflection pulley. If the hydraulic cylinder is retracted, the rear axle is pulled in an upward direction, as described above.

However, even if the rear axle is blocked, the stabilization means cannot prevent a tilting movement of the vehicle body completely in some operation states of the areal apparatus. This is due to the arrangement of the lateral ground supports at the length position of the vehicle. While the rear pair of ground supports can be arranged at the rear end of the vehicle, the front pair of ground supports is usually arranged between the front and rear axles. When the areal apparatus is extended in the front direction (i.e. the driving direction) of the vehicle, extending over the driver's cabin, the center of gravity of the vehicle shifts in this direction. Consequently the load of the vehicle is deflected towards its front axle, and the vehicle tends to perform a tilting movement around the front pair of ground supports, slightly lifting the rear end of the vehicle and lowering the driver's cabin against a spring force of the front suspension of the front axle. In another operating state of the areal apparatus, when it is extended in the opposite direction over the rear end of the vehicle, the spring force of the front axle suspension tends to promote a lifting of the driver's cabin, so that a tilting movement of the vehicle in the opposite direction over a rear pair of ground supports is promoted.

It is clear from the above that the usual spring dampening function of the front axle suspension promotes tilting movements in such operating conditions of the areal apparatus in an undesired way. However, there is no known way to deactivate the front suspension system. In particular it is impossible to block the front axle in the same way as with the hydraulically operable rear axle blocking device described above, because of the limited construction space in the front axle area and the increased complexity of the construction of the front axle, for example, by the limitations of the steering system. It must also be considered that a complete unloading of the front axle by pulling up the axle against the vehicle body, as with the rear axle blocking device, would even promote the front tilting of the vehicle when the areal apparatus is extended over the driver's cabin, so that the desired effect cannot be achieved.

SUMMARY OF THE INVENTION

It is therefore an object of the present invention to further develop the stabilization means of the checking system of the utility vehicle in question to even prevent tilting movements in an operating condition which the areal apparatus is largely extended in the front direction as well as in the rear direction of the vehicle, without increasing the complexity of the front axle suspension system to a large extend.

This object is achieved by a utility vehicle comprising the features of claim 1.

The stabilization means of the jacking system of the utility vehicle according to the present invention comprises at least one hydraulically lockable shock absorber integrated into the front axle suspension of the vehicle. It serves as a blocking means for deactivating the front axle suspension, i.e. to prevent any lifting or lowering movement of the front portion of the vehicle body with or against the spring force of the front suspension. Unlike the rear axle blocking device, the front axle is not lifted to be pulled against the vehicle body but keeps its position. If the hydraulically lockable shock absorber is locked, the front suspension with the front axle serves as an additional stabilizing means to prevent a tilting or lowering movement of the driver's cabin when the areal apparatus is extended in the front direction. If it is extended in the opposite direction over the rear portion of the vehicle, the spring force of the front suspension is blocked, and a tilting movement in the opposite direction is not further promoted.

This hydraulically lockable shock absorber can replace the usual shock absorber integrated into conventional front axle suspensions, and it is not necessary to integrate a large number of additional parts into the construction space of the front axle suspension. It is another advantage that the conventional rear axle blocking device, as described above, and the front axle blocking device represented by the lockable shock absorber are both hydraulically operable, so that they are both controlled by one hydraulic control means, like, for example, a control valve. This hydraulic control means can block the hydraulically lockable shock absorber at the same time or with a delay after activating the rear axle blocking device. This secures that the hydraulically lockable shock absorber is locked, i. e. the blocking of the front axle suspension is activated, only in case the rear axle blocking device is in its activated state.

According to a preferred embodiment of the present invention, the hydraulic control means comprise a control valve when an inlet port communicating with a hydraulic pressure source and with a first outlet port communicating with the rear axle blocking device and at least one second outlet port communicating with the hydraulically lockable shock absorber.

These and other aspects of the present invention will be apparent from and elucidated with the reference to a preferred embodiment described hereinafter.

BRIEF DESCRIPTION OF THE DRAWING

The only FIGURE is a schematic view of a firefighting vehicle as one embodiment of a utility vehicle according to the present invention.

DETAILED DESCRIPTION OF THE INVENTION

The firefighting vehicle 10 in the FIGURE is one example of a utility vehicle according to the present invention. The firefighting vehicle is equipped with a turnable ladder 12 on its top that is turnable around a vertical axis and comprises a number of ladder segments (not shown) that are slidably supported on each other so that the ladder 12 is extractable. In the turning position of the ladder 12 shown in the FIGURE, the ladder 12 can be extracted to extend partially over the driver's cabin 14 of the vehicle 10. When turned into the opposite direction, the ladder 12 can be extracted into the rear direction of the vehicle.

The vehicle 10 further comprises, as usual, a pair of front wheels 16 and a pair of rear wheels 18, the wheels of each pair 16, 18 being provided at the ends of a front axle 20 and rear axle 22, respectively. The front axle 20 and the rear axle 22 are mounted at a front axle suspension 24 and a rear axle suspension 26, respectively. Each of the front axle suspension 24 and a rear axle suspension 26 allow the vehicle body 30 resting on the suspensions 24, 26 to be lowered or lifted against or promoted by the spring force of the respective suspension 24, 26, so that a load impact acting from the ground during the driving operation of the vehicle 10 is dampened, and its transmission to the vehicle body 30 is restricted. This suspension function is well known with conventional vehicles 10 of any different kinds, and it shall not be described near further. Its representation in the FIGURE is also simplified to a large extent.

The vehicle 10 is further provided with a jacking system to give the vehicle 10 a safe stand when the turnable ladder 12 is operated. The jacking system comprises lateral ground supports 32, 34 for jacking the vehicle body 30. In the meaning of the present description, the term "jacking" shall designate a relocation of the weight load of the vehicle body 30 from the front end rear axle suspensions 24, 26 towards the lateral ground supports 32, 34, i. e. the front and rear axles 20, 22 are unloaded, and the load is taken by the ground supports 32, 34. In the present case this does not necessarily mean that the wheels 16, 18 loose their ground contact completely, but it is rather preferred that the wheels 16, 18 keep a minimum of ground contact.

There are two pairs of lateral ground supports 32, 34, namely one front pair of ground supports 32 located between the front axle 20 and the rear axle 22 and positioned nearer to the front axle 20 than to the rear axle 22, and a rear pair of ground support 34 positioned at the rear end of the vehicle 10 behind the rear axle 22. These ground supports 32, 34 are moveable between retracted positions at or within the vehicle body 30 and extracted operating positions in which the ends of the supports 32, 34 rest on the ground to jack the vehicle body 30. By this extracting and jacking operation the support area of the vehicle 10 is largely widened, giving the vehicle 10 a secure stand during a rescue operation.

The jacking system further comprises stabilization means for preventing tilting or rolling movements of the vehicle body 30 when the turnable ladder 12 is extracted. These stabilization means comprise a rear axle blocking device 36 for blocking the rear axle suspension 26 of the vehicle 10. This rear axle blocking device 36 can be operated hydraulically and comprises a hydraulic cylinder 38. At the end of the hydraulic cylinder 38, a steel rope 40 is attached with one end, while its other end is attached to the rear axle 26. The steel rope 40 is deflected over a deflection pulley 42. When the hydraulic cylinder 38 is retracted, the steel rope 40 is pulled to lift the rear axle 26 attached to the steel rope 40 upward direction to draw it against the vehicle body 30. This drawing action is performed against the spring force of the rear axle suspension 26 in the state in which the vehicle body is jacked by the lateral ground supports 32, 34. This has the effect that the rear axle 22 is unloaded, and the weight load of the vehicle body 30 is transferred to the lateral ground supports 32, 34. It is noted that in this blocking operation of the rear axle blocking device 36, the rear wheels 18 are not lifted from the ground completely but keep ground contact to a certain degree, as described above. However, the elastic suspension function of the rear axle suspension 26 is blocked in such a way that any tilting or rolling movement of the rear portion of the vehicle body 30 is prevented.

According to the present invention, the stabilization means further comprises a hydraulically lockable shock absorber 44 integrated into the front axle suspension 24 of the vehicle 10. This hydraulically lockable shock absorber 44 may replace a conventional shock absorber as one element of the front axle suspension 24, to dampen a load impact acting on the front axle 20. However, by locking this shock absorber 44, this dampening suspension function is blocked, so that the front axle 20 keeps a fixed position relative to the vehicle body 30. With other words, the hydraulically lockable shock absorber 44 represents a front axle blocking device. However, unlike the rear axle blocking device 36, no large and bulky additional construction elements (like, for example, the hydraulic cylinder 38 and the additional deflection pulley 42) are necessary at the front axle suspension 24, because the hydraulically lockable shock absorber 44 merely replaces the conventional shock absorber, without taking significantly more space.

The stabilization means further comprise hydraulic control means that allow a common control of the hydraulically lockable shock absorber 44 and the rear axle blocking device 36, i. e. its hydraulic cylinder 38. These hydraulic control means comprise a hydraulic control valve 46 to control the distribution of a hydraulic pressure of a hydraulic pressure source to both the hydraulic cylinder 38 of the rear axle blocking device 36 as well as to the hydraulically lockable shock absorber 44. In particular it is possible to control the hydraulic pressure to the respective elements such that the hydraulically lockable shock absorber 44 is locked at the same time or with a delay after activating the rear axle blocking device 36, to make sure that the front axle suspension 24 is locked only in case the rear axle blocking device 36 is activated. In more detail, the pressure originating from the hydraulic pressure source is distributed by the control valve 46 such that the hydraulic cylinder 38 is provided with an operation and/or control pressure to be retracted, and at the same time or with a predetermined delay, the hydraulically lockable shock absorber 44 is provided with a hydraulic control pressure to be operated such that the shock absorber 44 is locked. For this purpose the control valve 46 is provided with an inlet port communicating with a hydraulic pressure source 48 via an inlet line 50, with a first outlet port communicating with the rear axle blocking device 36 via a first outlet line 52, and with a second outlet port communicating with the hydraulically lockable shock absorber 44 via a second outlet line 54. It is noted that usually the vehicle 10 will be equipped with a pair of two hydraulically lockable shock absorber 44 at both lateral sides of the vehicle 10, i. e. at each front wheel 16, as usual, and each of these shock absorber 44 will be provided with a control pressure via a respective second outlet line.

In a state in which the rear axle blocking device 36 is activated and the hydraulically lockable shock absorber 44 is locked, both front and rear axle suspensions 24, 26 are deactivated. At its front portion, the vehicle 10 is additionally stabilized by the deactivated front axle suspension 24, because no lowering or lifting movement of the driver's cabin 14 with respect to the front axle 20 is possible. Consequently a tilting of the vehicle body 30 to the front direction is prevented when the turnable ladder 12 is extracted in the front direction. On the contrary, if the turnable ladder 12 is extracted to the opposite direction, because of the deactivation of the front axle suspension 24, a tilting movement of the vehicle body 30 in the opposite direction is not further promoted by the spring force of the front suspension 24.

What is claimed is:

1. A utility vehicle, comprising:
   a vehicle body, a rear axle, a rear axle suspension, and a front axle suspension;
   an extendable aerial apparatus comprising a turnable ladder or an aerial rescue platforms; and
   a jacking system, the jacking system comprising lateral ground supports for jacking the vehicle body and stabilization means for blocking tilting motions of the vehicle body in its jacked state, the stabilization means comprising a hydraulically operable rear axle blocking device for pulling the rear axle upward to unload weight of the vehicle body from the rear axle, transfer the weight to the lateral ground supports, and block the rear axle suspension of the vehicle,
   wherein the stabilization means further comprises at least one hydraulically lockable shock absorber integrated into the front axle suspension of the vehicle, and
   wherein the rear axle blocking device and the hydraulically lockable shock absorber are controlled by common hydraulic control means to lock the hydraulically lockable shock absorber at the same time or with a delay after activating the rear axle blocking device.

2. The utility vehicle according to claim 1, wherein the control means comprises a control valve with an inlet port communicating with a hydraulic pressure source and with a first outlet port communicating with the rear axle blocking device and at least one second outlet port communicating with the hydraulically lockable shock absorber, and wherein the common hydraulic control means is configured to lock the hydraulically lockable shock absorber only when the rear axle blocking device pulls the rear axle upward.

3. The utility vehicle of claim 2, wherein the hydraulically operable rear axle blocking device includes a steel rope and a hydraulic cylinder for pulling the steel rope to pull the rear axle upward.

4. The utility vehicle of claim 2, wherein said extendable aerial apparatus is configured to extend in a front direction over a front axle, turn toward a rear direction, and extend in the rear direction over the rear axle, the rear direction being opposite the front direction.

5. The utility vehicle of claim 2, further comprising a front axle, and wherein the front axle suspension is operatively connected to the front axle, and wherein at least two of the lateral ground supports are located between the rear axle and the front axle, such that locking the hydraulically lockable shock absorber prevents tilting of the vehicle body in the front direction when the extendable aerial apparatus is extended in the front direction, and prevents promotion of tilting of the vehicle body in the rear direction when the extendable aerial apparatus is extended in the rear direction.

* * * * *